United States Patent [19]

Sladdin et al.

[11] 4,070,934
[45] Jan. 31, 1978

[54] MACHINE TOOLS

[75] Inventors: Stuart Rodney Sladdin, Newcastle on Tyne; Malcolm Thorneycroft, Whitley Bay, Tyne and Wear, both of England

[73] Assignee: Charles Churchill Limited, England

[21] Appl. No.: 687,598

[22] Filed: May 18, 1976

[51] Int. Cl.$^2$ .......................... B23B 7/04; B23B 3/00
[52] U.S. Cl. .......................................... 82/2 R; 29/36
[58] Field of Search .................. 82/2 R; 29/36, 39; 408/35

[56] References Cited

U.S. PATENT DOCUMENTS

| 1,197,541 | 9/1916 | Potter | 29/36 |
| 3,580,129 | 5/1971 | Austin et al. | 82/2 R |
| 3,796,116 | 3/1974 | Spreitzer | 82/2 R |

Primary Examiner—Leonidas Vlachos
Attorney, Agent, or Firm—Watson, Cole, Grindle & Watson

[57] ABSTRACT

A turning machine comprising a rotatable chuck for supporting a workpiece to be machined, two simultaneously and independently operable turrets for carrying tools for machining the workpiece, each turret being supported by a toolslide with respect to which it can be indexed about an axis parallel to the rotational axis of the chuck, the axes being on opposite sides of the rotational axis, both toolslides being movable along slideways parallel to the rotational axis and one at least of said toolslides also being movable along a slideway perpendicular to the rotational axis, a ram mounted for movement with respect to one of the toolslides in a direction towards and away from the chuck, and a support member rotatably mounted on the ram for supporting the end of the workpiece remote from the chuck.

4 Claims, 3 Drawing Figures

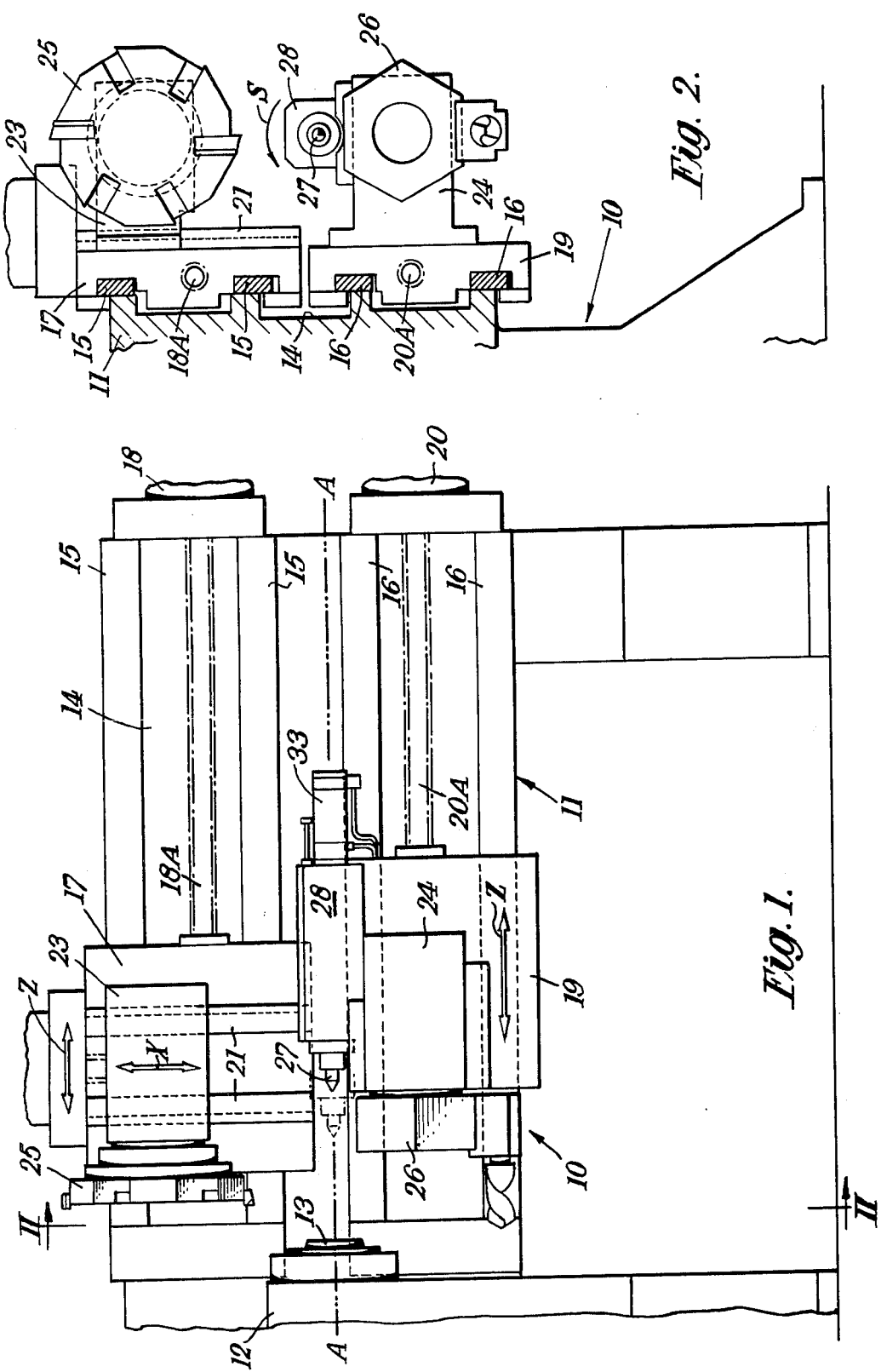

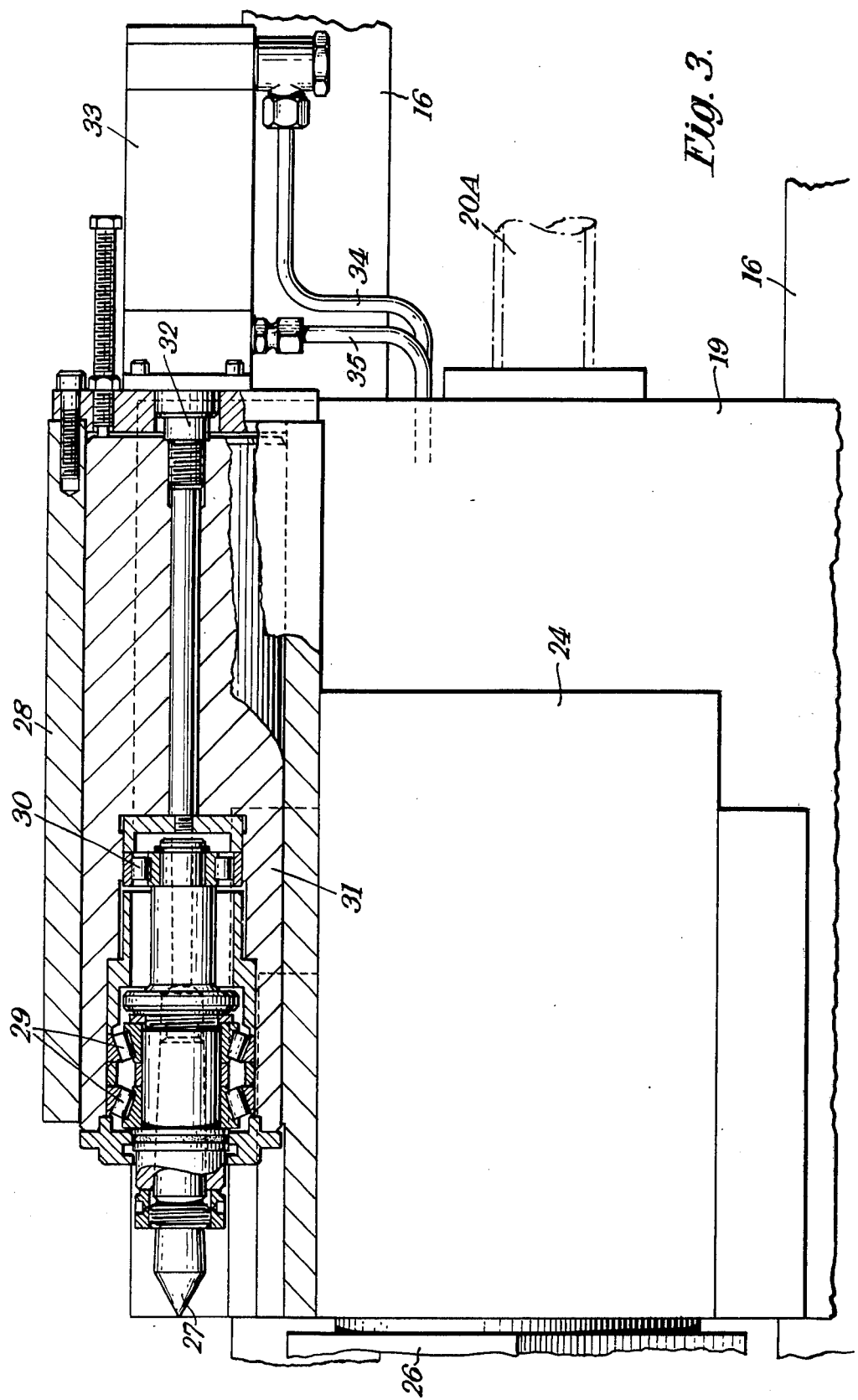

MACHINE TOOLS

BACKGROUND OF THE INVENTION

1. Field of the Invention

The invention relates to turning machines, with or without a numerical program control facility, of the kind comprising two indexing turrets and a co-operating chuck for holding the workpiece.

2. Description of the Prior Art

In a configuration known as a three axis machine tool, the upper turret is movable along the main machine axis and also perpendicular to the main machine axis and the lower turret is capable of movement along the main machine axis only. In the configuration, however, described in U.S. Pat. application Ser. No. 582,263, filed on May 30, 1975, and designated a four axis machine tool, the lower turret is capable also of movement perpendicular to the main machine axis.

In such machines it is often desired to machine a workpiece between centres. This is normally achieved by mounting a centre support in a tooling station on one of the turrets. This procedure, however, is not very satisfactory since such a centre support has only a light duty and is not suitable for supporting heavy components. Moreover, this arrangement is not capable of sustaining the heavy cutting forces involved in machining to the full capacity of the machine.

SUMMARY OF THE INVENTION

The present invention provides a turning machine comprising a rotatable chuck for supporting a workpiece to be machined, two simultaneously and independently operable turrets for carrying tools for machining the workpiece, each turret being supported by a toolslide with respect to which it can be indexed about an axis parallel to the rotational axis of the chuck, the axes being on opposite sides of said rotational axis, both toolslides being movable along slideways parallel to the rotational axis and one at least of the toolslides also being movable along a slideway perpendicular to the rotational axis, a ram mounted for movement with respect to one of the toolslides in a direction towards and away from the chuck, and a support member rotatably mounted on the ram for supporting the end of the workpiece remote from the chuck.

BRIEF DESCRIPTION OF THE DRAWINGS

One embodiment of turning machine according to the invention is illustrated, by way of example, in the accompanying drawings in which FIG. 1 is a side elevation of the machine, FIG. 2 is a section on the line II—II in FIG. 1, and FIG. 3 is a side elevation, on a larger scale and partly in section of a portion of the machine.

DESCRIPTION OF A PREFERRED EMBODIMENT

The machine 10 shown in the drawings comprises a bed 11 on which is mounted a headstock 12. The headstock 12 contains the main drive spindle (not shown) which carries a chuck 13. The chuck 13 can be arranged to rotate about the main machine axis A in either direction, but it is preferred that is should rotate in the cutting mode as shown by the arrow S in FIG. 2.

Fastened to the front face 14 of the bed 11 are two upper and lower pairs 15, 16 of hardened steel slideways, both extending in the direction of the Z axis. The upper pair 15 is disposed above the main machine axis A and the lower pair 16 is below the main machine axis. An upper carriage 17 is supported by the slideways 15 and can be reciprocated along them in the direction of the Z axis by a lead screw 18A driven by a motor partially shown at 18 and a lower carriage 19 is reciprocable along the slideways 16 by a lead screw 20A driven by a motor partially shown at 20. The lower carriage 19 carries a toolslide 24, in which is mounted a lower indexable turret 26.

The upper carriage 17 carries a pair of slideways 21 which extend perpendicular to the slideways 15 in the direction of the X axis and which support a toolslide 23, which is reciprocable along the slideways 21 by a motor driven lead screw (not shown). The toolslide 23 carries an upper indexable turret 25.

Fixed to the toolslide 24 is a housing 28 which supports in alignment with the chuck 13 a support centre 27 and which can be projected from the position shown in full lines in FIG. 1 to the position shown in chain-dotted lines to provide for machining of a workpiece between centres.

As shown in FIG. 3, the support centre 27 is rotatably mounted by bearings 29, 30 in a ram 31 which is reciprocable in the housing 28 and is attached to the piston rod 32 of a piston (not shown) disposed in a cylinder 33. The ram 31 is shown retracted in FIG. 3, but when fluid under pressure is supplied to the cylinder 33 through a pipe 34 and the other end of the cylinder is connected to exhaust through a pipe 35, the ram 31 will be advanced by the piston rod 32 to cause the support centre 27 to engage and support the end remote from the chuck 13 of a workpiece supported in the chuck. The support centre 27 is firmly supported by the ram 31 and the housing 28 when in its operative position and is therefore able to support heavy cutting loads.

When the support centre 27 is retracted, the turret 26 is free to index. However, when it is desired to machine work between centres, the turret 26 is indexed to a free station which carries no tooling and which allows the support centre 27 to be extended. The support centre 27 is then moved forward by the ram to engage the workpiece, after which the upper turret 25 is free to machine the workpiece.

The machine illustrated is a three axis machine. If desired, however, provision may be made as described in U.S. Pat. application Ser. No. 582,263 for vertical movement of the toolslide 24 with respect to the carriage 19. In this case it is necessary to move the toolslide 24 to a level such that the support centre 27 is coaxial with the chuck 13 prior to advance of the support centre 27 to engage a workpiece.

What we claim as our invention and desire to secure by Letters Patent is:

1. A turning machine comprising a rotatable chuck for supporting a workpiece to be machined, two simultaneously and independently operable turrets for carrying tools for machining the workpiece, one of said turrets having a free tool station devoid of tools and each turret being supported by a toolslide with respect to which it can be indexed about an axis parallel to the rotational axis of the chuck, said axes being on opposite sides of said rotational axis, both toolslides being movable along slideways parallel to said rotational axis and one at least of said toolslides also being movable along a slideway perpendicular to said rotational axis, a ram mounted on the toolslide carrying said one turret at the side of said one turret remote from the chuck, said ram being movable with respect to said toolslide in a direction towards and away from the chuck, and a support member rotatably mounted on the ram, said support member being movable by said ram past said station devoid of tools to support the end of the workpiece remote from the chuck.

2. A machine according to claim 1, in which the ram is movable in a housing fixed to said toolslide.

3. A machine according to claim 2, which includes a fluid pressure operated piston and cylinder assembly for imparting movement to the ram to move the support member towards and away from the workpiece.

4. A machine according to claim 1, wherein the chuck is rotatable about a horizontal axis and the axes of indexing of the turrets are disposed respectively above and below the rotational axis of the chuck.

* * * * *